United States Patent
Smith et al.

(10) Patent No.: US 6,371,033 B1
(45) Date of Patent: Apr. 16, 2002

(54) HIGH CAPACITY INTEGRATED RAILWAY CAR TRUCK

(75) Inventors: Stephen W. Smith, Dallas; John W. Coulborn, Forth Worth, both of TX (US); V. Terrey Hawthorne, Lisle, IL (US); Samuel R. Williams, Dublin, OH (US); C. Dale Christie, Naperville, IL (US); John D. Oliver, Flossmoor, IL (US); Glen F. Lazar, Palatine, IL (US)

(73) Assignees: TRN Business Trust, Dallas, TX (US); Amsted Industries Incorporated, Chicago, IL (US); The Timken Company, Canton, OH (US)

( * ) Notice: Subject to any disclaimer, the term of this patent is extended or adjusted under 35 U.S.C. 154(b) by 0 days.

(21) Appl. No.: 09/412,134

(22) Filed: Oct. 5, 1999

(51) Int. Cl.[7] .................................................. B61D 1/00
(52) U.S. Cl. ................. 105/157.1; 105/167; 105/182.1; 105/200
(58) Field of Search ............................. 105/96.1, 157.1, 105/157.2, 167, 182.1, 189, 190.2, 200, 218.1, 224.1, 225; 295/36.1

(56) References Cited

U.S. PATENT DOCUMENTS

| | | | | |
|---|---|---|---|---|
| 2,446,592 A | * | 8/1948 | Huldt .......................... | 295/36.1 |
| 2,611,656 A | * | 9/1952 | Vanderberg ................. | 295/36.1 |
| 3,699,897 A | * | 10/1972 | Sherrick ................... | 105/218 R |
| 4,363,276 A | | 12/1982 | Nuemann ................... | 105/197 |
| 4,370,933 A | | 2/1983 | Mulcahy ..................... | 105/197 |
| 4,674,412 A | * | 6/1987 | Mulcahy et al. .......... | 105/224.1 |
| 4,938,152 A | * | 7/1990 | List .............................. | 105/208 |
| 5,017,025 A | | 5/1991 | Williams et al. ............ | 105/165 |
| 5,111,753 A | | 5/1992 | Zigler et al. ................ | 105/230 |
| 5,237,933 A | * | 8/1993 | Bucksbee ................ | 105/224.1 |
| 5,452,665 A | | 9/1995 | Wronkiewicz et al. ..... | 105/198 |
| 5,461,986 A | | 10/1995 | Sarnicki et al. ............. | 105/165 |
| 5,462,367 A | * | 10/1995 | Davidson et al. ........... | 384/459 |
| 5,611,284 A | | 3/1997 | Smith et al. ................. | 105/220 |
| 5,626,355 A | | 5/1997 | Voss et al. ................... | 280/276 |
| 5,638,757 A | | 6/1997 | Cortesi ........................ | 105/168 |
| 6,189,456 B1 | * | 2/2001 | Smith et al. ............. | 105/218.1 |

OTHER PUBLICATIONS

Lonsdale, Cameron et al. entitled "Effects of Increased Gross Rail Load on 36–inch Diameter Freight Car Wheels", Railway Wheel Manufacture's Engineering Committee 2001, Technical Conference Proceedings, Chicago, IL, Conference Manual, pp. 12–18, Sep. 25, 2001.

Product Brochure from American Steel Foundries and Griffen Wheel, AMSTED Industries Inc. Chicago, Illinois, 4 pages, Published on or before May 1995.

AAR Standard S–300–95 Basic Freight Car Truck Design Data, 8 pages.

AAR Specification M–101–90 Axles, Carbon Steel, Heat––treated, 24 pages.

AAR Specifications M–107–84 and M–208–84 Wheels, Carbon Steel, 27 pages.

AAR Specification M–934–82 Freight Car Journal Roller Bearings, 32 pages.

AAR Specification M–202–97 Specification for Truck Bolsters, 16 pages.

AAR Specification M–203–83 Specification for Truck Side Frames, Cast Steel, 22 pages.

* cited by examiner

Primary Examiner—S. Joseph Morano
Assistant Examiner—Frantz F. Jules
(74) Attorney, Agent, or Firm—Baker Botts L.L.P.

(57) ABSTRACT

A three piece stabilized railway car truck is provided with dimensions corresponding generally with an AAR nominal 100 ton size truck and a load carrying capability satisfactory for use with railway cars having a 315,000 pound gross weight on rail rating. Various components of the truck have been modified to improve the fatigue life of each component and the overall service life of the resulting railway truck.

20 Claims, 4 Drawing Sheets

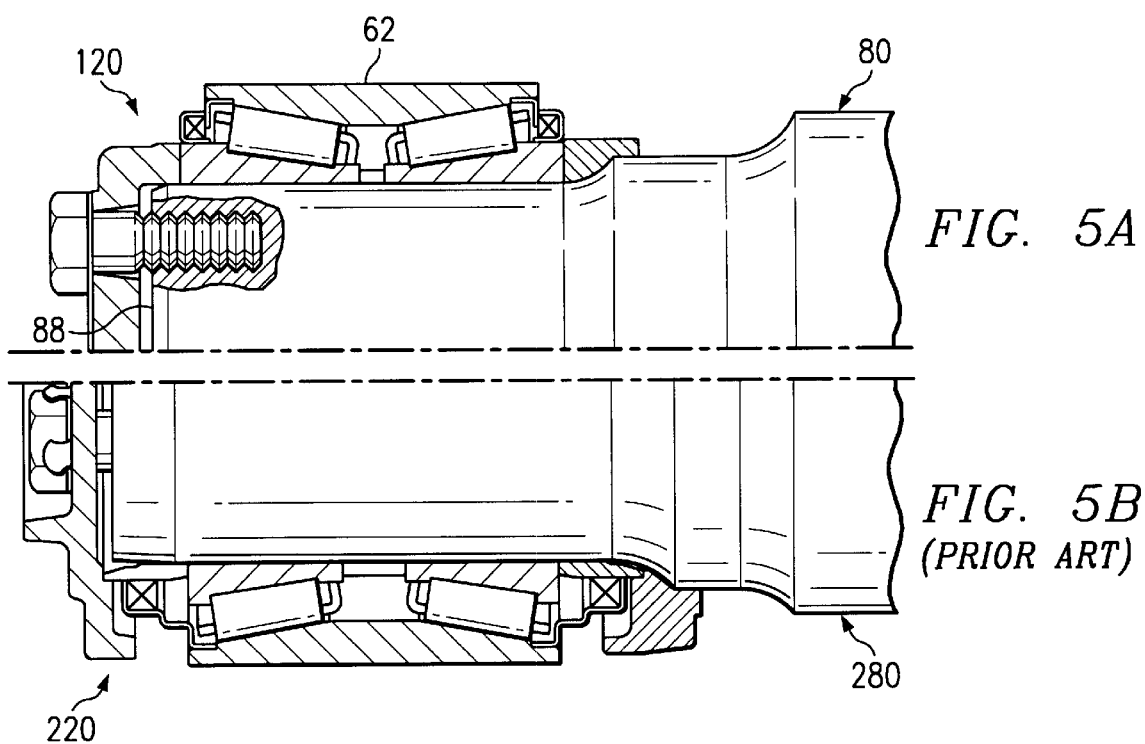
FIG. 5A
FIG. 5B
(PRIOR ART)
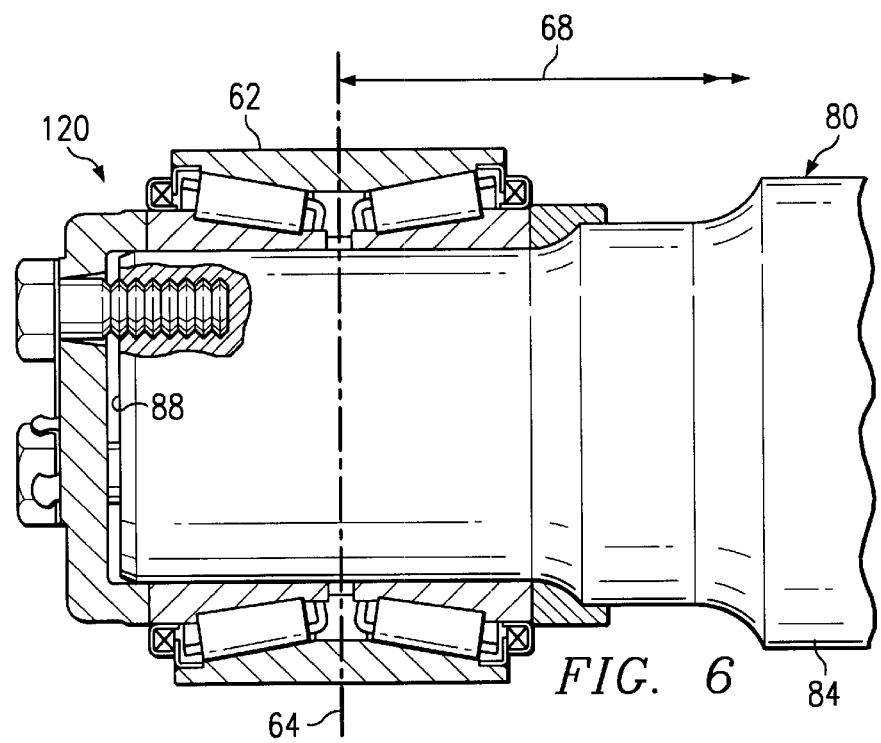
FIG. 6

HIGH CAPACITY INTEGRATED RAILWAY CAR TRUCK

TECHNICAL FIELD OF THE INVENTION

This invention relates in general to the field of railway car trucks and more particularly to a railway car truck satisfactory for use with a railway car having a gross weight on rail rating of three hundred and fifteen thousand pounds (315,000 lbs) and overall dimensions and weight substantially the same as current railway car trucks used with railway cars having gross weight on rail ratings of two hundred and eighty six thousand pounds (286,000 lbs).

BACKGROUND OF THE INVENTION

Most modern railway cars include a pair of railway car trucks with each railway car truck having a pair of axles. Typically, a pair of wheels are secured to each axle with the wheels spaced from each other a distance corresponding with the gauge of the associated railway tracks. A pair of roller bearing assemblies are generally mounted on each axle to reduce friction and to allow the axle and associated wheels to rotate with a minimum amount of applied force. A railway truck axle typically includes a shaft with a wheel seat and journal formed adjacent to opposite ends of the shaft. A wheel is secured to each wheel seat. Respective journals extend from each wheel seat for mounting respective bearing assemblies adjacent to each end of the railway truck axle. Each bearing assembly is preferably tightly fitted on its respective journal. Each bearing assembly typically includes a housing or adapter. Portions of each side frame of the associated railway car truck are engaged with and supported by respective bearing housings. The journals often have the smallest diameter of the railway truck axle and the wheel seats often have the largest diameter.

A railway car truck typically includes a bolster or main transverse member which transmits loads from an associated railway carbody to respective side frames through a suspension system. The associated carbody typically engages the truck bolster through a truck center plate which is generally aligned with and contacts the associated carbody center plate. Side bearings may also be disposed between the truck bolster and carbody. A typical truck center plate includes a generally circular area designed to accept a protruding center plate from the associated carbody. The truck center plate provides the principal bearing surface to support the carbody on the truck bolster. Truck center plates are often fitted with a horizontal wear plate and a vertical wear ring to improve wear characteristics and extend the service life of the associated truck bolster.

The different size capacity of Association of American Railroads (AAR) standard freight car trucks are commonly indicated by nominal or rated load carrying capacity of a railway car equipped with such trucks. Typical truck size indications are 40 ton, 50 ton, 70 ton, 100 ton, and 125 ton. A more specific indication of truck size is the total allowable gross weight on rail of a railway car equipped with the particular size truck. Examples of such truck size indications are 142,000 lbs, 177,000 lbs, 220,000 lbs, 263,000 lbs, and 315,000 lbs respectively. Since 1994, AAR standard freight car trucks for have been commercially available for gross weight on rail railway cars with 286,000 pound ratings.

Total allowable or maximum gross weight on rail for a railway truck is generally determined by the capacity of the journal bearings on the associated railway truck axles. Also, associated with each nominal railway car truck size is a given wheel diameter size to limit maximum wheel/rail contact stress. Examples of typical journal bearing sizes and wheel sizes for AAR standard freight car trucks are included in the following table.

| Nominal Truck Size | Maximum Gross Weight on Rail | Wheel Journal Bearing Size | Wheel Size Diameter |
| --- | --- | --- | --- |
| 40 ton | 142,000 lbs | 5 in × 9 in | 33 in |
| 50 ton | 177,000 lbs | 5½ in × 10 in | 33 in |
| 70 ton | 220,000 lbs | 6 in × 11 in | 33 in |
| 100 ton | 263,000 lbs | 6½ in × 12 in | 36 in |
| 125 ton | 315,000 lbs | 7 in × 12 in | 38 in |

Total allowable or maximum gross weight on rail may also be referred to as "gross rail load" (GRL), "total allowable gross weight on the rails" or "maximum gross weight on the rails."

Before a railway car truck having a nominal size of one hundred tons may be used on a railway car rated for more than two hundred and sixty three thousand pounds gross weight on rail, the railway car truck must be designed and tested for the resulting increased loads. Prior to 1994, railway car trucks having a nominal truck size of one hundred tons were generally limited to a maximum gross weight on rail rating of two hundred and sixty three thousand pounds. At the present time, railway car trucks having a nominal truck size of one hundred tons are available for use on railway cars rated for two hundred and eighty six thousand pounds gross weight on rail.

Modifications to existing freight car truck designs to improve load carrying capability and/or service life are generally limited due to standard AAR classifications which require interchangeability of component parts. Also, the resulting railway car must meet applicable AAR operating envelopes.

SUMMARY OF THE INVENTION

In accordance with teachings of the present invention, railway car trucks are provided for use with a railway car having a maximum gross weight on rail rating of 315,000 pounds and substantially improved performance when compared to prior AAR approved railway car trucks for 315,000 pound gross weight on rail rated railway cars. One aspect of the present invention includes providing a railway car truck having a frame assembly, a suspension system, a pair of axles, bearing assemblies and wheels satisfactory for use with a railway car having a 315,000 pound gross weight on rail rating. Various modifications have been made to a railway truck incorporating teachings of the present invention to increase load carrying capacity, to reduce fretting and/or wear of various components and to increase fatigue life of various components.

Technical benefits of the present invention include providing a railway car truck rated for use with a railway car having approximately 315,000 pounds gross weight on rail at an initial cost and life cycle cost substantially equal to or less than current AAR approved railway car trucks used with 286,000 pound gross weight on rail rated railway cars. A railway car truck incorporating teachings of the present invention may be used with existing car bodies having dimensions and clearances which are only suitable for use with AAR nominal size 100 ton trucks. By combining existing car bodies with railway car trucks incorporating teachings of the present invention, the resulting railway cars may carry substantially heavier loads while satisfying current AAR operating envelopes and specifications.

Further technical benefits of the present invention include providing a railway car truck rated for 315,000 pound gross weight on rail application having wheels with diameters less than thirty-eight inches (38") and a weight equal to or less than the weight of wheels used on railway car trucks rated for 286,000 pounds gross weight on rail application. A railway car truck incorporating teachings of the present invention also includes wheels having thermal and mechanical capabilities equal to or better than wheels associated with current railway car trucks rated for 286,000 pound gross weight on rail and current railway car trucks rated for 315,000 pounds gross weight on rail. The shape of the wheels increases thermal capacity and reduces mechanical stresses. The thickness of the rim on each wheel is preferably limited to approximately one and five-eighths inches (1⅝") to reduce the overall weight of the wheel. For some applications, providing a rim which is approximately one and five-eighths inches thick may reduce the weight of the wheels by approximately twenty pounds. A railway car truck incorporating teachings of the present inventions preferably includes wheels having hub inside diameters larger than the inside diameter of normal thirty six inch (36") diameter wheels to prevent placing the wheels on a railway car truck which is not rated for 315,000 pounds gross weight on rail.

Still further technical benefits of the present invention include providing a railway car truck satisfactory for use with a railway car having a rating of more than approximately 286,000 pounds gross weight on rail to as much as 315,000 pounds gross weight on rail or larger with:

- bearing assemblies having a life expectancy substantially equal to the life expectancy of the associated wheels;
- a longitudinal wheel base approximately equal to five feet ten inches;
- axle fatigue life equivalent to the fatigue life of axles on current AAR approved trucks used with railway cars having ratings of 286,000 pounds gross weight on rail;
- bolster and side frame fatigue life equivalent to the fatigue life of bolsters and side frames on current AAR approved trucks used with railway cars having ratings of 286,000 pounds gross weight on rail;
- satisfactory for use with both truck mounted and body mounted brake systems;
- complies with current AAR specifications for hunting and curving;
- weight approximately the same as the weight of current AAR approved trucks used with railway cars having a rating of 286,000 pounds gross weight on rail;
- operating performance equal to or better than current AAR approved trucks used with railway cars having a rating of 286,000 pounds gross weight on rail; and
- initial cost and life cycle cost substantially equal to or less than current AAR approved trucks used with railway cars having a rating of 286,000 pounds gross weight on rail.

BRIEF DESCRIPTION OF THE DRAWINGS

A more complete understanding of the present invention may be acquired by referring to the following description taken in conjunction with the accompanying drawings in which like reference numbers indicate like features and wherein:

FIG. 5A is a schematic drawing in section and in elevation with portions broken away showing a bearing assembly and axle satisfactory for use with a railway car truck incorporating teachings of present invention;

FIG. 5B is a schematic drawing in section and in elevation with portions broken away showing a prior bearing assembly and axle associated with presently available railway car trucks used with railway cars having 315,000 pounds gross weight on rail ratings for comparison with generally corresponding portions of the bearing assembly and axle of FIG. 5A;

FIG. 6 is a schematic drawing in section and in elevation with portions broken away showing the bearing assembly and axle of FIG. 5A satisfactory for use with a railway car incorporating teachings of the present invention;

DETAILED DESCRIPTION OF THE INVENTION

The present invention and its advantages are best understood by referring to FIGS. 1–9 of the drawings, like numerals being used for like and corresponding parts of the drawings.

For purposes of this application, the term "truck" is used to refer to a railway car truck which provides support, mobility and guidance to an associated railway car. A typical truck includes wheels, axles, bearings, side frames, a bolster, brake rigging, springs, and associated connecting components. For purposes of this application, the term "railway car" is used to refer to any railway car having a truck incorporating teachings of the present invention. Examples of railway cars which may be satisfactorily used with trucks incorporating teachings of the present invention include, but are not limited, to freight cars, boxcars, refrigerated cars, articulated cars, well cars, gondola cars, coal cars, hopper cars, tank cars, and spine cars.

A railway car typically has a first truck disposed adjacent to and supporting the A end of the railway car and a second truck disposed adjacent to and supporting the B end of the railway car. The first and second trucks may sometimes be referred to as a "car set." Each truck typically has two axles with two wheels disposed on opposite ends of each axle.

Therefore, the weight of the associated railway car and any lading carried thereby will be supported by four axles, eight wheels and respective bearing assemblies.

The term "gross weight on rail" is used to refer to the combined weight of a railway car including its associated trucks and any lading carried by the railway car. The maximum weight of lading or "load limit" for railway cars meeting AAR design standards and specifications is generally equal to the maximum allowable gross weight on rail less the light weight of the railway car. The "light weight" is the empty weight of a railway car including its associated trucks and other equipment considered as standard for the railway car.

One of the technical benefits of the present invention includes increasing the load limit of a railway car having gross weight on rail rating in the range of more than 286,000 pounds to 315,000 pounds or more by providing railway trucks which weigh substantially less than current railway trucks used with railway cars having a gross weight on rail rating of 315,000 pounds.

For purposes of this application, the terms "gross weight on rail", "gross weight on the rails", and "gross rail load" shall have the same meaning and may be used interchangeably to describe various features of the present invention. Gross weight on rail and gross rail load may be referred to as GRL. The term "286 K GRL rating" shall mean maximum allowable gross weight on rail rating of 286,000 pounds. The term "315 K GRL rating" shall mean maximum allowable gross weight on rail rating of 315,000 pounds.

Figure 1:
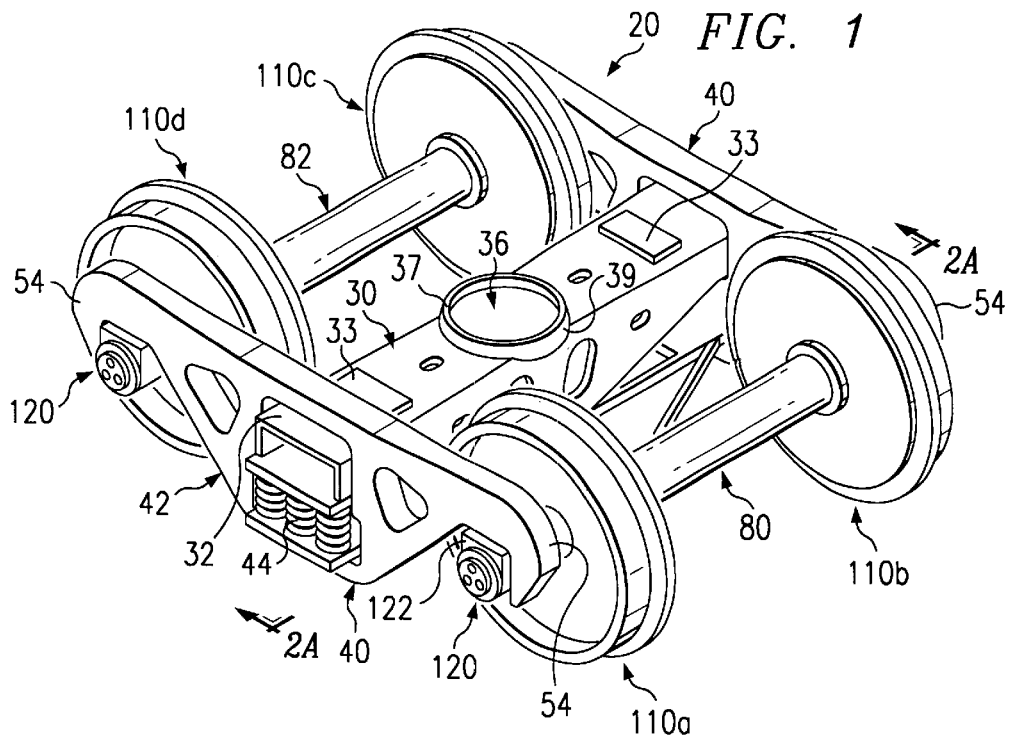
FIG. 1 is a schematic drawing showing an isometric view of a typical railway car truck which may be modified in accordance with teachings of the present invention for use with railway cars having 315,000 pounds gross weight on rail ratings.

FIG. 1 shows a schematic representation of truck 20 which may be modified in accordance with teachings of the present invention for use with a railway car having a 315 K GRL rating. Truck 20 includes bolster 30 with side frames 40 and 42 attached to opposite ends thereof. Truck 20 may be generally described as a "stabilized three piece truck". Bolster 30 may sometimes be referred to as a "truck bolster".

Truck 20 includes a pair of axles 80 and 82. A pair of wheels 110 are mounted on each axle 80 and 82. Bearing assemblies 120 are also disposed on each axle 80 and 82 between respective wheel 110 and each end of each axle 80 and 82. As discussed later in more detail, portions of each side frame 40 and 42 engage respective bearing assemblies 120.

For purposes of describing various features of the present invention, the axles associated with truck 20 have been designated 80 and 82. However, axles 80 and 82 have substantially the same configuration and dimensions. In a similar manner, all wheels 110 used with truck 20 in accordance with teachings of the present invention preferably have substantially the same configuration and dimensions. Wheels 110 preferably have a diameter of less than thirty eight inches. For one application, wheels 110 have a nominal diameter of approximately thirty six inches. For purpose of describing various features of the present invention wheels 110 have been designated 110a, 110b, 110c and 110d.

Figure 4:
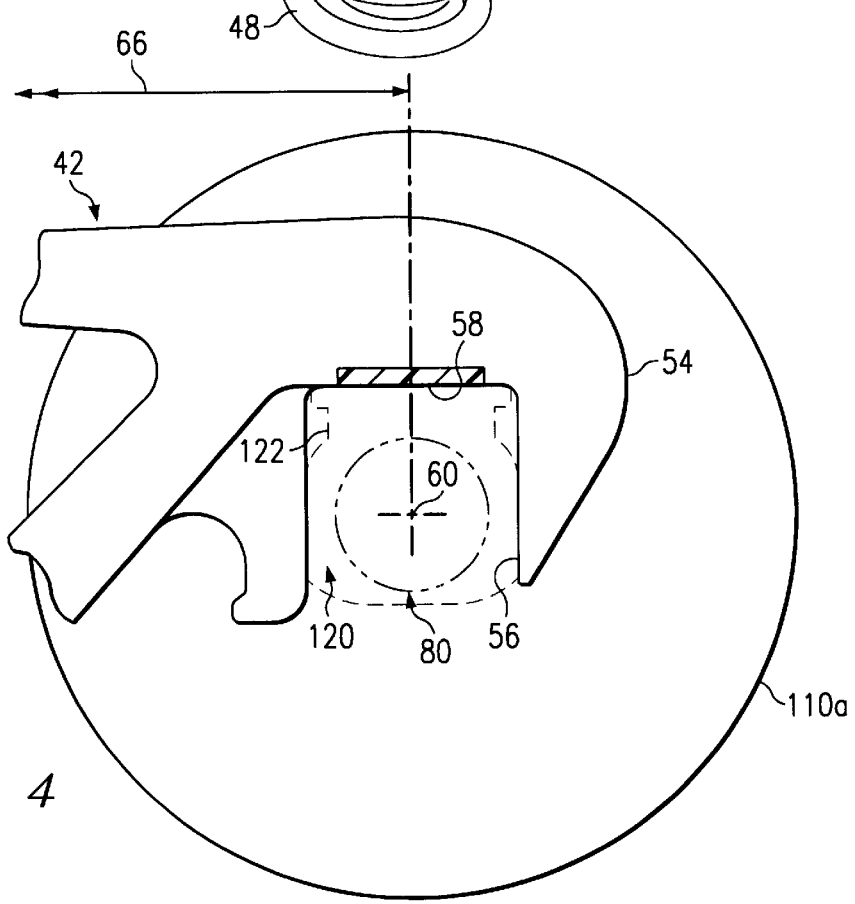
FIG. 4 is a side view in elevation with portions broken away of a side frame and wheel of a railway car truck incorporating teachings of the present invention.

The configuration and overall dimensions of truck 20 correspond generally with approved AAR trucks currently used with railway cars having 286 K GRL ratings. These same dimensions and configurations also correspond generally with current AAR nominal one hundred ton size trucks. For example, the longitudinal wheel base of truck 20 is defined as the horizontal distance between the center of first axle 80 and second axle 82. For the embodiment of the present invention as shown in FIG. 4, the center of axle 80 is designated as 60. A portion of longitudinal wheel base 66 is shown in FIG. 4.

Longitudinal wheel base 66 of truck 20 is preferably approximately equal to five feet, ten inches which corresponds generally with the longitudinal wheel base of an AAR nominal 100 ton size truck. Longitudinal wheel base 66 of truck 20 is preferably less than six feet. By limiting the length of longitudinal wheel base 66 truck 20 will generally have improved operating characteristics as compared to presently available AAR nominal 125 ton size trucks used with railway cars having a 315 K GRL rating.

Figure 2A:
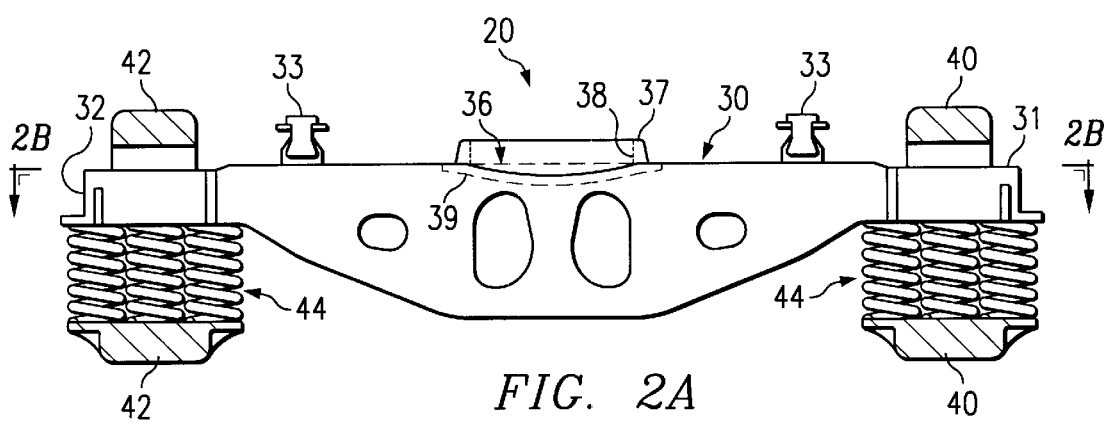
FIG. 2A is a schematic drawing in section and in elevation with portions broken away taken generally along lines 2A—2A of FIG. 1 showing portions of a truck bolster and suspension system incorporating teachings of the present invention.
Figure 2B:
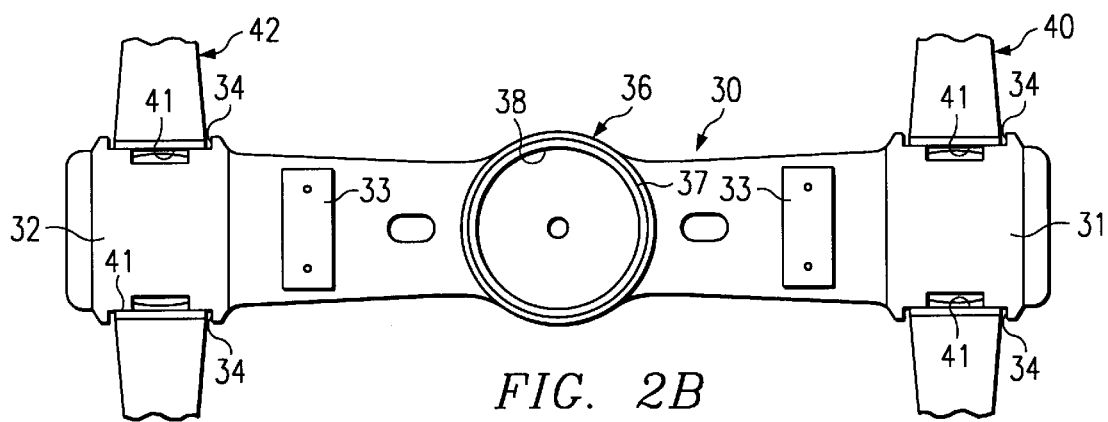
FIG. 2B is a schematic drawing in section and in elevation with portions broken away taken generally along lines 2B—2B of FIG. 2A.

As best shown in FIGS. 2A and 2B, ends 31 and 32 of bolster 30 are respectively engaged with side frames 40 and 42. For the embodiment of the present invention as shown in FIGS. 1, 2A and 2B, each end 31 and 32 of bolster 30 includes a protruding wing or guide which may sometimes be referred to as a gib. Each gib includes a pair of channels or lands 34 which fit with and bear against column respective guide surfaces 41 of side frames 40 and 42. An important feature of the present invention includes minimizing the clearance or spacing between each land or channel 34 and its associated column guide surface 41. By minimizing the clearance or spacing, angling (non-vertical movement) of side frames 40 and 42 relative to bolster 30 and to each other may be substantially reduced or eliminated.

Bolster 30 also includes center plate 36, rim 37 and wear liner 38. Portions of bolster 30 adjacent to and supporting center plate 36 are preferably reinforced to support increase loads associated with a railway car having a 315 K GRL rating. The reinforced portions are indicated generally at 39.

A pair of side bearing pads 33 are preferably disposed on bolster 30 between center plate 36 and respective ends 31 and 32. Side bearing pads 33 preferably maintain substantially constant contact with adjacent portions of an associated railway carbody (not expressly shown).

Figure 3:
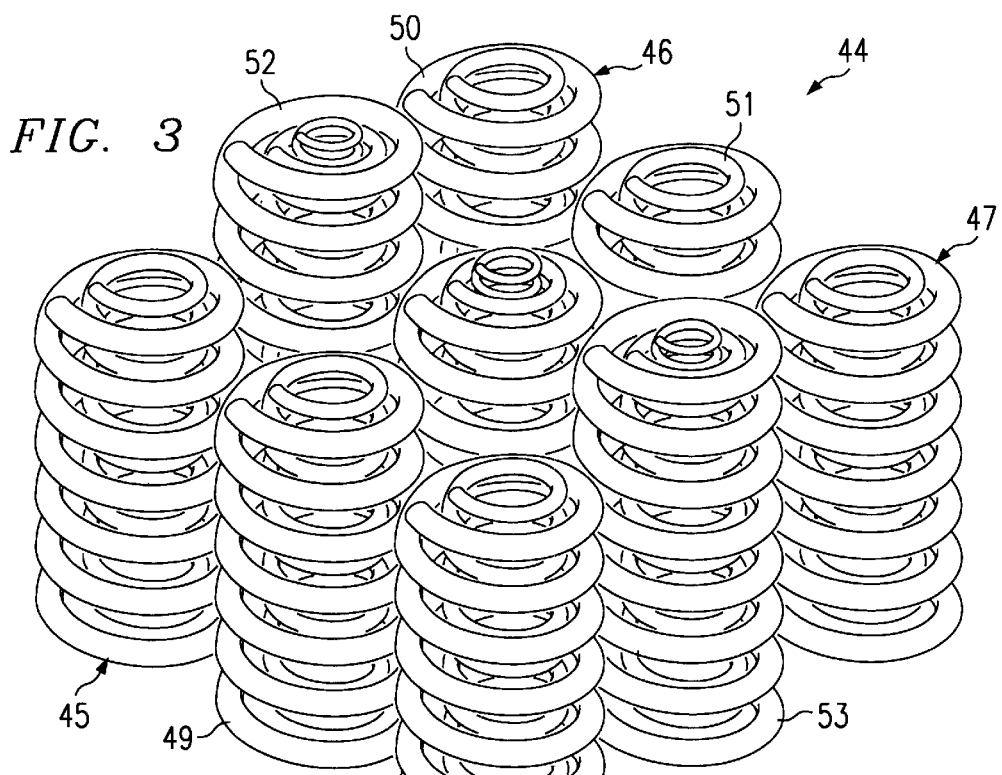
FIG. 3 is a schematic drawing with portions broken away showing an isometric view of a spring group satisfactory for use with a suspension system of a railway car truck incorporating teachings of the present invention.

The suspension system for truck 20 preferably includes two spring groups 44 respectively disposed between portions of bolster 30 adjacent to ends 31 and 32 and respective portions of side frames 40 and 42. For the embodiment of the present invention as best shown in FIGS. 2A and 3, each spring group 44 preferably includes nine spring module assemblies arranged in a rectangular configuration. For one application each spring group 44 preferably includes seven outer coil springs, seven inner coil springs, three inner coil springs, two outer control springs and two inner control springs. Spring group 44 may sometimes be a "dual rate" control spring group.

Spring module assemblies 45, 46, 47 and 48 are located at respective corners of each spring group 44. Spring module assemblies 45, 46, 47 and 48 preferably include an outer load coil with an inner load coil concentrically therein. Spring module assemblies 49, 50 and 51 each contain three coil springs concentrically disposed within each other. Spring module assemblies 52 and 53 each contain an outer control spring with an inner control spring disposed concentrically therein. The dimensions and configuration of the coil springs contained within each spring group 44 are selected to be compatible with a 315 K GRL rating.

FIG. 4 is a schematic drawing showing a portion of side frame 42 and wheel 110a. Each end of side frames 40 and 42 preferably includes respective pedestals 54 sized to be respectively engaged with bearing assemblies 120. For the embodiment of the present invention as shown in FIG. 4, pedestal 54 preferably includes opening 56 which may be engaged with adapter or housing 122 of respective bearing assembly 120. For some applications elastomeric pad 58 may be disposed within each pedestal 54 adjacent to respective adapter 122. Elastomeric pads 58 represent one of the features of the present invention which often allow truck 20 to be satisfactorily used with railway cars having approximately 315 K GRL rating.

Elastomeric pads 58 absorb a portion of the impact between respective pedestals 54 and associated bearing assemblies 120 during movement of truck 20 and its associated railway car. Repeated impact between pedestal 54 and its associated bearing assembly 120 will tend to reduce the fatigue life of both pedestal 54 and/or bearing assembly 120. The reduction in fatigue life may be a particular problem when truck 20 is used with a railway car having a 315 K GRL rating. Elastomeric pads 58 and spring groups 44 represent features of the present invention which allow truck 20 to be satisfactorily used with railway cars having 315 K GRL ratings while, and at the same time, to have substantially the same fatigue life as presently available trucks used with railway cars having 286 K GRL ratings and having overall dimensions corresponding with an AAR nominal one hundred ton size truck.

Various portions of truck 20 are shown in U.S. Pat. No. 4,363,276 entitled, Railroad Car Truck Side Frame-Bolster Connection; U.S. Pat. No. 4,370,933 entitled, Railway Car Truck Bolster Assembly; U.S. Pat. No. 5,111,753 entitled, Lightweight Fatigue Resistant Railcar Truck Bolster and U.S. Pat. No. 5,452,665 entitled, Bolster Friction Shoe Pocket with Relieved Outer Wall. Also, various portions of truck 20 including wheels 110 are available from American Steel Foundries and Griffin Wheel which are owned by AMSTED Industries Incorporated, located in Chicago, Ill.

FIGS. 5A and 5B are schematic drawings showing a comparison between bearing assembly 120 satisfactorily for use on truck 20 and bearing assembly 220 which is presently used on AAR nominal 125 ton size trucks for railway cars with a 315 K GRL rating. Examples of bearing assemblies for trucks are shown in U.S. Pat. No. 5,017,025, entitled "Bearing Assembly For A Shaft Journal" and U.S. Pat. No. 5,462,367, entitled "Compact Bearing And Stiffened Journal." Bearing assembly 120 is substantially similar to bearing assemblies shown and described in U.S. Pat. No. 5,462,367 except the length of bearing assembly 120 has been reduced, the inside diameter increased and the outside diameter increased.

FIG. 6 is a schematic drawing showing bearing assembly 120 mounted adjacent to end 88 of axle 80. Various features of axle 80 are shown in FIGS. 5A, 6, 7, 8 and 9. Since axles 80 and 82 are substantially identical, only axle 80 will be discussed in detail.

As shown in FIGS. 5A, 6, 7, 8 and 9, axle 80 includes shaft body or barrel 92, a pair wheel seats 84, and associated journals 86 formed adjacent to opposite ends 88 and 90 of axle 80. Shaft body or barrel 92 extends between wheel seats 84. Wheel seats 84 preferably have an outside diameter 350 which is larger than the outside diameter 300 of barrel 92 and outside diameter 320 journals 86. Dust guard seat 94 is also provided adjacent to each end of axle 80 between respective wheel seats 84 and journals 86.

One or more fillets are preferably formed on the exterior of axle 80 between adjacent portions having a difference or change in diameter. Such fillets are formed to minimize any stress caused by changes in the outside diameter of axle 80. Fillets 96 serve as transitions between shaft body 92 and respective wheel seats 84. Fillets 97 served as transitions between respective wheel seats 84 and dust guard seats 94. Fillets 98 serve as transitions between respective dust guard seats 94 and journals 86. Increasing the radii of fillets 96, 97 and 98 will generally increase the fatigue life of axle 80 for a given load. For one embodiment of the present invention, the radius of fillets 97 and 98 may be approximately one and one half inches (1.5"). Fillets 96 may have a radius of approximately three inches (3.0").

Figure 7:
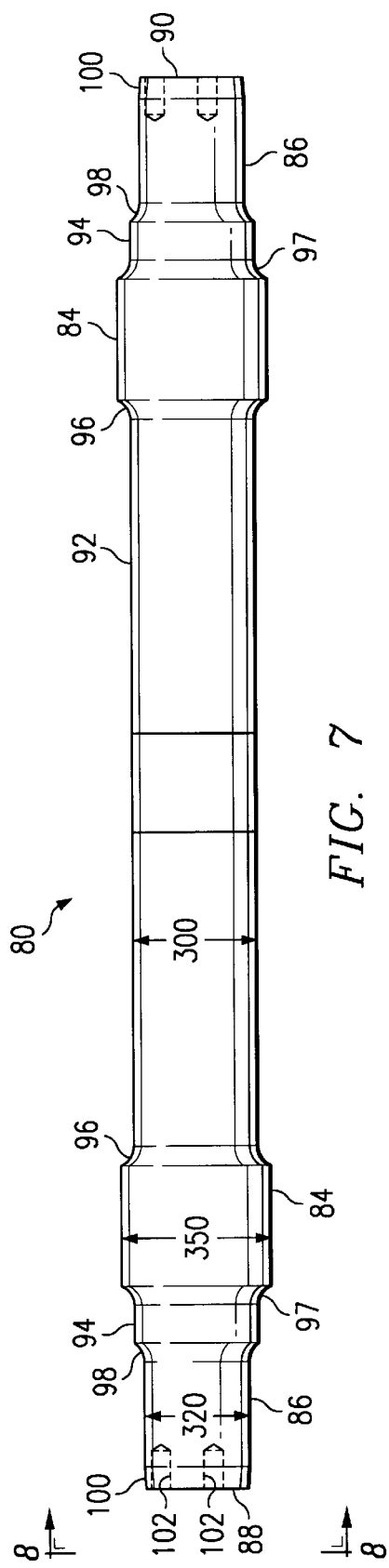
FIG. 7 is a schematic drawing in elevation showing a side view of a railway truck axle satisfactory for use with a railway car truck incorporating teachings of the present invention.
Figure 9:
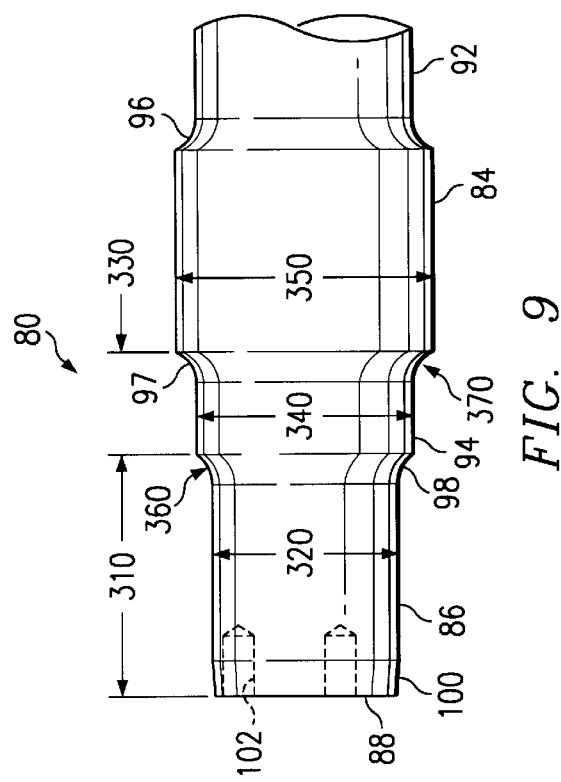
FIG. 9 is a schematic drawing in elevation with portions broken away showing a side view of the railway truck axle of FIG. 7.
Figure 8:
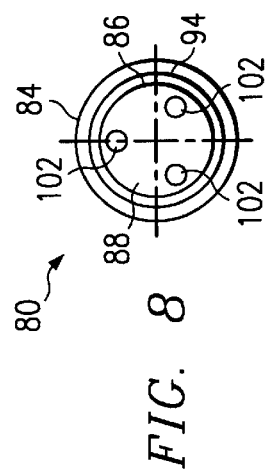
FIG. 8 is an end view of the railway truck axle shown in FIG. 7.

Journals 86 preferably include respective tapered collars 100, which terminate at respective ends 88 and 90. As best shown in FIGS. 7 and 8, three threaded bolt holes are formed in ends 88 and 90 for use in securing respective bearing assemblies 120 on respective journals 86.

For one embodiment of the present invention, each journal 86 will preferably have a generally cylindrical configuration with outside diameter 320 of approximately six and one-half inches (6.5") and an approximate length 310 of nine inches (9.0"). Each dust guard seat 94 will preferably have a generally cylindrical configuration defined in part by outside diameter 340 of approximately seven and one-half inches (7.5") and a length of approximately three and one-half inches (3.5"). Each wheel seat 84 will preferably have a generally cylindrical configuration defined in part by outside diameter 350 of approximately nine and one-fourth inches (9.25").

The length of journals 86 on axle 80 have preferably been reduced to approximately nine inches (9.0"). Reducing the length of journals 86 substantially reduces the moment arm associated with any forces applied to each bearing assembly 120 mounted on respective journal 86. For one embodiment of the present invention, the diameter of journals 86 is preferably increased to approximately six and one-half inches (6.5"). Each bearing assembly 120 preferably has a generally corresponding inside diameter.

Bearing assembly 120 as shown in FIGS. 5A and 6 may sometimes be described as "roller bearing assembly". The length of bearing assembly 120 is preferably selected to correspond generally with the length of respective journals 86. The inside diameter of each bearing assembly 120 is also selected to be compatible with the outside diameter of respective journal 86. For one embodiment of the present invention bearing assembly 120 may have an outside diameter of approximately ten and three-eights inches (10.375") and an inside diameter of approximately six and one-half inches (6.5"). Each bearing assembly 120 preferably includes cup 62 having a length of approximately 6.562".

Each wheel 110 preferably has an inside diameter of approximately nine and one fourth inches so that only wheels with a diameter of thirty six inches which are designed for heavy loads may be mounted on axle 80. The enlarged diameter of wheel seats 84 prevents installing standard thirty six inches diameter wheels which may fail under the heavy loads associated with truck 20.

The length of dust guard seats 94 has also been increased to approximately three and one-half inches (3.5") as compared to the length of previous AAR standard "truck axles". One of the benefits from increasing the length of dust guard seats 94 is maintaining the same spacing or distance 68 between radial centerlines 64 of respective journals 86 and the radial centerlines associated with respective wheel seats 84. For one application the longitudinal spacing between respective radial centerlines of wheel seats 84 on axle 80 is approximately seventy nine inches. By maintaining longitudinal spacing along axle 80, various standard truck components may be satisfactorily used with truck 20 with only minor modifications.

Finite element modeling techniques may be used to determine stresses present when various components of truck 20 are subjected to loads associated with railway cars having a 315 K GRL rating. The fatigue life of various components associated with truck 20 may be calculated using analysis techniques set forth in AAR Manual of Standards and Recommended Practices Section C, Part 2, Chapter 7. By incorporating various teachings of the present invention, trucks 20 when used with railway cars having 315 K GRL ratings may have a fatigue life approximately the same as AAR nominal 100 ton size trucks used with railway cars having 286 K GRL ratings.

Examples of axles satisfactory for use with the present invention are shown in co-pending U.S. Patent application entitled High Capacity Axle for Railway Freight Cars, Ser. No. 09/167,402, filed Oct. 6, 1998 which claims the benefit of U.S. Provisional Application Serial No. 60/061,543, filed Oct. 7, 1997. Such railway car axles are available from Trinity Industries located in Dallas, Tex.

Although the present invention has been described in detail, it should be understood that various changes, substitutions and alterations can be made hereto without departing from the spirit and scope of the invention as defined by the appended claims.

What is claimed is:

1. A railway car truck for use with a railway car having a gross weight on rail rating greater than 286,000 pounds, the truck including a bolster, a pair of side frames, a pair of axles spaced longitudinally from each other, a pair of wheels spaced laterally from each other and mounted on each axle, a pair of journals formed on each axle and spaced laterally from each other, and respective bearing assemblies disposed on each journal, comprising:

the truck having a longitudinal wheel base less than six feet in length;

each wheel having a diameter of approximately thirty-six inches;

each axle having a first wheel seat and a second wheel seat for respectively securing a wheel thereon;

each wheel seat having a diameter larger than the nominal diameter of an AAR standard "Class F" railway car axle; and each wheel having a hub inside diameter formed to receive the axle wheel seat.

2. The truck of claim 1 further comprising:

each side frame having a pedestal formed on respective ends thereof;

each bearing assembly having an adapter mounted thereon;

each pedestal having an opening sized to receive each respective bearing adapter; and a respective elastomeric pad disposed between portions of each pedestal and adjacent portions of the respective bearing adapter.

3. The track of claim 1 further comprising:

the bolster having a first end and a second end;

the pair of sideframes having a first side frame and a second sideframe;

the first end slidably disposed within a portion of the first side frame and the second end slidably disposed within a portion of the second side frame;

a respective spring group disposed between each end of the bolster and a respective portion of the associated side frame; and each spring group having nine spring module assemblies.

4. The truck of claim 1 wherein the longitudinal wheel base has a length of approximately five feet ten inches.

5. The truck of claim 1 wherein each wheel comprises a thickness of approximately one and five-eighths inches.

6. The truck of claim 1 further comprising:

each wheel seat having a nominal diameter of approximately nine and one-fourth inches; and each wheel mounted on each respective wheel seat.

7. The truck of claim 1 further comprising:

each bearing assembly having a midpoint; and the bearing assemblies mounted on each axle spaced approximately seventy nine inches from each other as measured from the respective midpoints.

8. A railway car truck for use with a railway car having a gross weight on rail rating of approximately 315,000 pounds, comprising:

a bolster having a first end and a second end with a center plate formed on the bolster intermediate the first end and the second end;

a pair of side frames slidably mounted on respective ends of the bolster;

a pair of axles spaced longitudinally from each other;

each axle having a first journal and a second journal for respectively mounting a bearing assembly thereon;

each journal having a nominal outside diameter of approximately six and one-half inches;

each bearing assembly having a nominal inside diameter of approximately six and one-half inches to allow mounting each bearing assembly on one of the journals;

each axle having a first wheel seat and a second wheel seat for respectively securing a wheel thereon;

each wheel seat having a diameter larger than the nominal diameter of an AAR standard "Class F" railway car axle whereby only wheels designed for heavy loads may be mounted on each axle;

the truck having a longitudinal wheel base of less than six feet in length; each axle having a first wheel and a second wheel mounted thereon; and each wheel having a diameter of approximately thirty-six inches and a hub inside diameter formed to receive each axle wheel seat.

9. The truck of claim 8 further comprising each wheel seat having a nominal diameter of approximately nine and one-fourth inches.

10. The truck of claim 8 wherein the bolster further comprises a reinforced portion disposed adjacent to the center plate to accommodate loads from the railway car when the associated gross weight on rail is approximately 315,000 pounds.

11. The truck of claim 8 further comprising;

each side frame having a pedestal formed on respective ends thereof, each bearing assembly having an adapter mounted thereon;

each pedestal having an opening sized to receive each respective bearing adapter; and an elastomeric pad disposed between portions of each pedestal and adjacent portions of the respective bearing adapter to improve the fatigue life of the truck when subjected to heavy loads.

12. A railway car truck for use with a railway car having a gross weight on rail rating of 315,000 pounds, the truck including a bolster, a pair of side frames, a pair of axles spaced longitudinally from each other, a pair of wheels spaced laterally from each other and mounted on each axle, a pair of journals formed on each axle and spaced laterally from each other, and respective bearing assemblies disposed on each journal, comprising;

the truck having a longitudinal wheel base less than six feet in length;

each wheel having a diameter of approximately thirty-six inches and having a hub inside diameter formed to mount an axle wheel seat having a nominal inside diameter larger than the nominal diameter of an AAR standard "Class F" railway car axle;

each side frame having a pedestal formed on respective ends thereof;

each bearing assembly having an adapter mounted thereon;

each pedestal having an opening size to respectively receive one of the bearing adapters; and an elastomeric pad disposed between portions of each pedestal and adjacent portions of the respective bearing adapter.

13. The truck of claim 12 further comprising:

the bolster having a first end and a second end with each end of the bolster slidably disposed within a portion of one of the side frames;

a respective spring group disposed between each end of the bolster and a respective portion of the associated side frame; and each spring group having nine spring module assemblies.

14. The truck of claim 12 further comprising a longitudinal wheel base having a length of approximately five feet ten inches.

15. The truck of claim 12 wherein each wheel comprises a thickness of approximately one and five-eighths inches.

16. The truck of claim 12 further comprising:

each axle having a pair of wheel seats disposed adjacent to opposite ends thereof;

each wheel seat having a nominal diameter of approximately nine and one-fourth inches; and each wheel having an outside diameter of approximately thirty six inches and mounted on each respective wheel seat.

17. The truck of claim 12 further comprising:

each bearing assembly having a radial centerline; and the bearing assemblies mounted on each axle spaced approximately seventy nine inches from each other as measured from the respective radial centerlines.

18. The truck of claim 12 further comprising a longitudinal wheel base having a length of less than thirty-eight inches.

19. A railway car truck for use with a railway car having a gross weight on rail rating in the range of greater than 286,000 pounds to approximately 315,000 pounds, the truck, including a bolster, a pair of side frames, a pair of axles spaced longitudinally from each other, a pair of wheels spaced laterally from each other and mounted on each axle, a pair of journals formed on each axle and spaced laterally from each other, and respective bearing assemblies disposed on each journal, comprising;

overall dimensions and configuration of the bolster and pair of side frames corresponding generally with corresponding overall dimensions and configuration of a bolster and pair of sideframes for an AAR nominal one hundred ton sized truck;

each wheel having a diameter less than thirty-eight inches;

each side frame having a pedestal formed on respective ends thereof;

each bearing assembly having an adapter mounted thereon;

each pedestal having an opening sized to receive a respective bearing adapter;

a pad disposed between portions of each pedestal and adjacent portions of the respective bearing adapter to improve fatigue life of the truck when subjected to loads greater than 286,000 pounds;

a longitudinal wheel base having a length of approximately five feet ten inches;

each axle having a first wheel seat and a second wheel seat for respectively securing a wheel thereon; and each wheel seat having a diameter larger than the nominal diameter of a AAR standard "Class F" railway car axle whereby only wheels designed for heavy loads may be mounted on each axle.

20. The truck of claim 19 further comprising each wheel seat having a nominal diameter of approximately nine and one-fourth inches.

* * * * *